Dec. 29, 1964 E. A. GYORI ETAL 3,163,459
TRAILER FOR HAULING AUTOMOBILES
Filed April 13, 1961 4 Sheets-Sheet 2

INVENTORS
EMERY A. GYORI
LESTER J. HAMMONS
BY
M. A. Hobbs
ATTORNEY

Dec. 29, 1964  E. A. GYORI ETAL  3,163,459
TRAILER FOR HAULING AUTOMOBILES
Filed April 13, 1961  4 Sheets-Sheet 1

INVENTORS
EMERY A. GYORI
LESTER J. HAMMONS
BY
ATTORNEY

Dec. 29, 1964     E. A. GYORI ETAL     3,163,459
TRAILER FOR HAULING AUTOMOBILES
Filed April 13, 1961     4 Sheets-Sheet 3
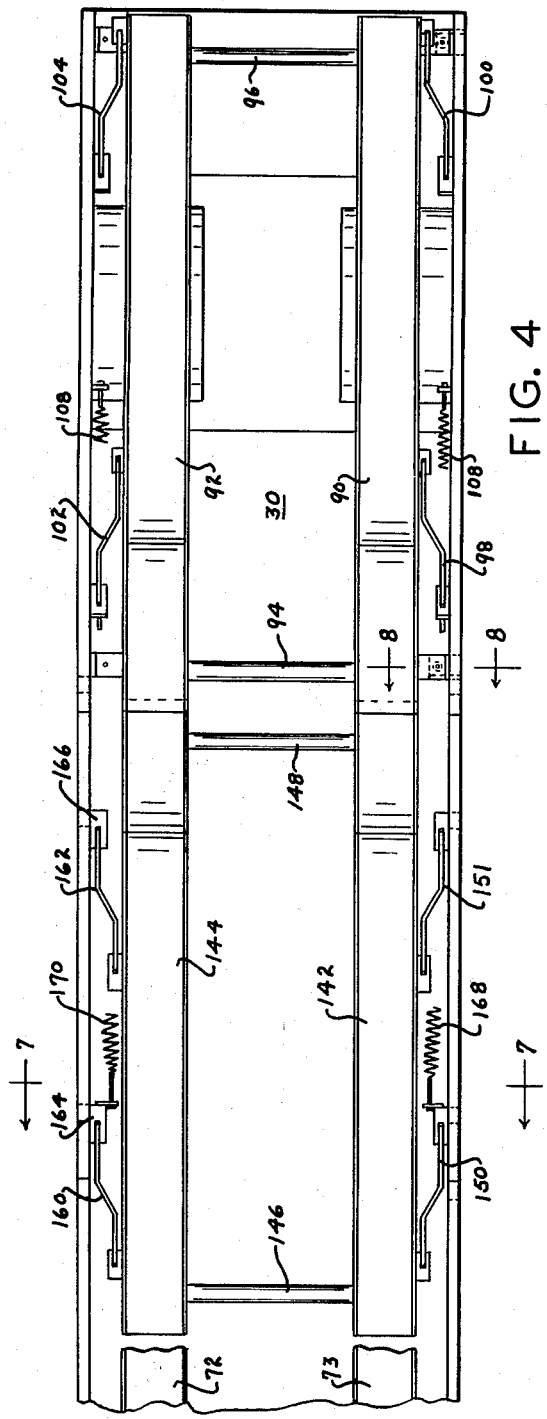
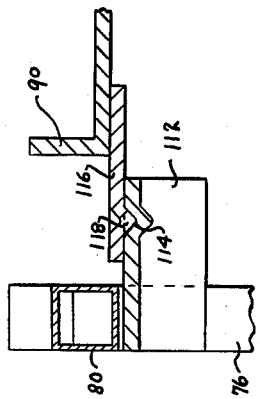
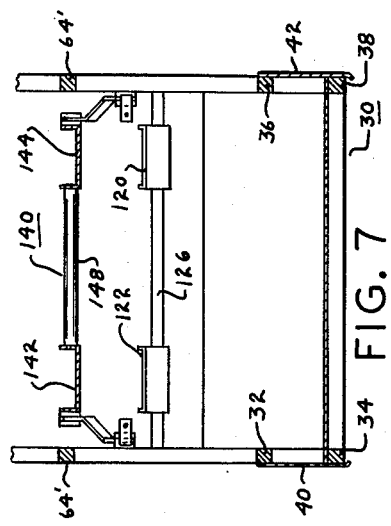
INVENTORS
EMERY A. GYORI
LESTER J. HAMMONS
BY
ATTORNEY Dec. 29, 1964 E. A. GYORI ETAL 3,163,459
TRAILER FOR HAULING AUTOMOBILES
Filed April 13, 1961 4 Sheets-Sheet 4

INVENTORS
EMERY A. GYORI
LESTER J. HAMMONS
BY
M. A. Hobbs
ATTORNEY

United States Patent Office 3,163,459
Patented Dec. 29, 1964

3,163,459
TRAILER FOR HAULING AUTOMOBILES
Emery A. Gyori and Lester J. Hammons, both of 4000 W. Sample St., South Bend, Ind.
Filed Apr. 13, 1961, Ser. No. 102,893
5 Claims. (Cl. 296—1)

The present invention relates to trailers and more particularly to trailers for hauling a number of automobiles and similar vehicles on one load.

In the last several years major strides have been made in perfecting the transportation of automobiles on railroad cars such that railroads have become highly competitive with the trucking industry which, until recently, had dominated automobile hauling in the transportation field. One of the important approaches of the trucking industry in meeting this competition has been the attempt to increase the hauling capacity of the automobile-carrying trailers by increasing the overall length of the trailers so that one or two additional automobiles could be carried on each delivery. This approach has been appreciably hampered by the fact that many states, particularly those east of the Mississippi River, limit the overall length of the truck and trailer combination to forty feet, while a number of states west of the Mississippi to fifty feet. Regardless of the two permissible lengths of the hauling vehicles, the capacity of the trailers has not been sufficient to meet recent railroad competition. It is therefore one of the principal objects of the present invention to provide a trailer for hauling automobiles which is so constructed and arranged that it will haul at least one additional automobile over conventional trailers of comparable length, and which can be easily loaded and unloaded.

Another object of the invention is to provide a trailer for hauling automobiles in which the cars are so placed within and on the trailer that all available space is utilized when the trailer is fully loaded, and which holds the automobiles firmly in sufficiently spaced relation that they can be transported over long distances and poor roads without damaging the automobiles.

Still another object of the invention is to provide a compact, sturdy and relatively simple trailer construction for carrying a plurality of automobiles, which can readily be adapted to various sized automobiles and used in conjunction with and towed by most conventional trailer-tractors.

A further object is to provide a versatile trailer of the aforesaid type which includes as an integral part all the structure required to fully load and unload the automobiles, with the exception of a ramp to the ground, and which has movable supports for a number of the automobiles readily shiftable between carrying position and loading and unloading positions.

In conventional trailers for hauling automobiles, the automobiles are generally arranged in two substantially horizontal rows, one at the bottom or in the bed and the other on top of a frame or super-structure, leaving a substantial amount of space above the hood and trunk of each automobile unused. The present invention therefore has as a further object to provide a novel structure which utilizes most of this previously unused space, regardless of the now various legal limitations imposed on the length of the trailers from one state to another.

Another object of the invention is to provide an automobile hauling trailer which has a rigid super-structure for the upper row of vehicles in combination with adjustable and shiftable supports for some of the vehicles to facilitate loading and unloading.

Additional objects and advantages of the invention will become apparent from the following description and accompanying drawings, wherein:

FIGURE 4 is a fragmentary top plan view of the trailer with the automobiles removed;

FIGURE 7 is a vertical cross-sectional view of the trailer taken on line 7—7 of FIGURE 4;

FIGURE 8 is a fragmentary vertical cross-sectional view of the present structure taken on line 8—8 of FIGURE 4;

Figure 1:
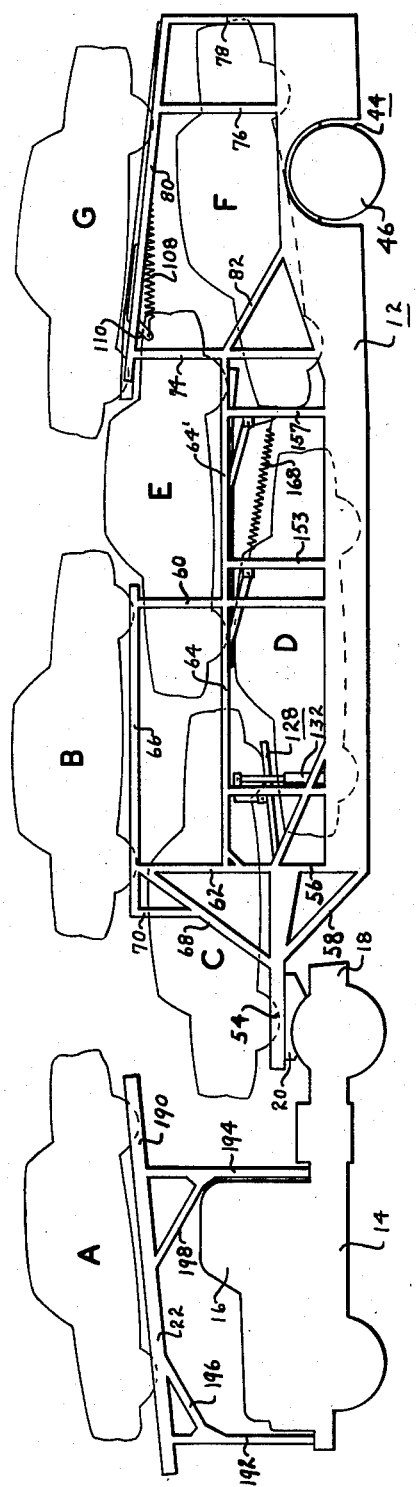
FIGURE 1 is a side elevational view of a tractor-trailer combination, the trailer embodying the present invention and having mounted thereon a number of automobiles showing the manner in which they are hauled by a fully-loaded trailer.
Figure 2:
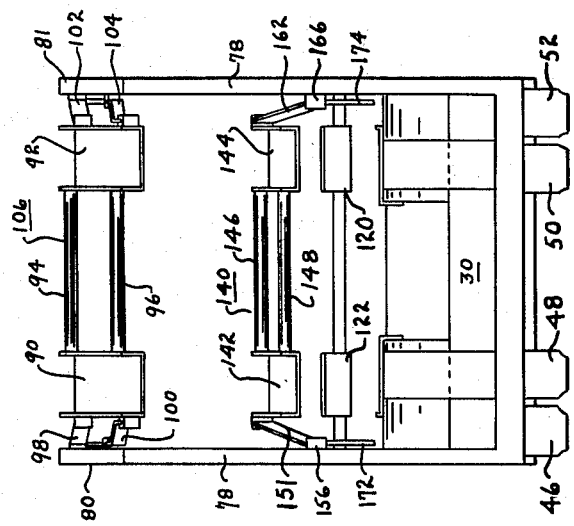
FIGURE 2 is a rear elevational view of the trailer shown in FIGURE 1.
Figure 10:
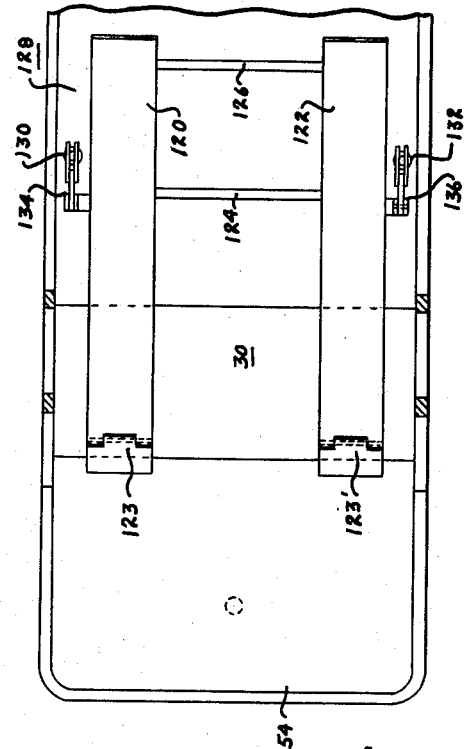
FIGURE 10 is a fragmentary cross-sectional view taken on line 10—10 of FIGURE 9.

Referring more specifically to the drawings and to FIGURE 1 in particular, numeral 12 designates our trailer, and 14 a tractor for towing the trailer, including a cab 16 for the driver, frame 18, and fifth wheel 20 supporting the forward end of trailer 12. Automobiles A, B, C, D, E, F and G are shown mounted on the combination tractor-trailer, automobile A being supported by a separate frame 22 rigidly mounted on tractor 14, and the remaining automobiles being mounted on and supported by trailer 12. For the purpose of the present invention, tractor 14 may be considered conventional in construction and operation, and the trailer can be unhitched from the tractor, and the front end thereof supported by parking wheels (not shown) adjacent the front end thereof.

The trailer consists of a long-low bed 30 formed by side member 32 and 34 on the left-hand side of the trailer, and side members 36 and 38 on the right-hand side, the two members on each side being enclosed on the external surface by steel panels 40 and 42, respectively. The panels 40 and 42 are welded or otherwise joined to the respective members to form a solid, smooth appearance externally. The bed thus formed is supported at the rear on undercarriage 44 including dual wheels 46 and 48 on the left-hand side and wheels 50 and 52 on the right-hand side. The wheels of the undercarriage may be of the single-axle type or of the tandem type, the particular undercarriage employed not forming a part of the present invention. The forward end of bed 30 is connected to fifth wheel 20 by a forward extension 54 joined to bed 30 by vertical frame members 56 and a pair of diagonal frame members 58 joined at their upper ends to extension 54 and at the lower end to the forward end of bed 30.

A rigid frame structure for supporting automobile B is attached to the forward end of bed 30 and consists on each side of upright members 60 and 62 and horizontal members 64 and 66, said members being reinforced by diagonal members 68 connected at their upper end to the upper end of members 62 and at their lower end to projection 54. The forward ends of members 66 are supported by braces 70 connected thereto and to diagonal members 68. Channel members 72 and 73 supported rigidly on members 66 support automobile B.

Figure 6:
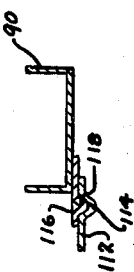
FIGURE 6 is a fragmentary vertical cross-sectional view of a portion of the trailer, taken on line 6—6 of FIGURE 3.
Figure 5:
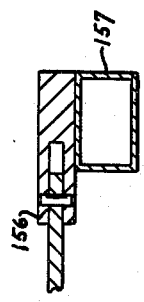
FIGURE 5 is a fragmentary horizontal cross-sectional view of a portion of the trailer, taken on line 5—5 of FIGURE 3.
Figure 3:
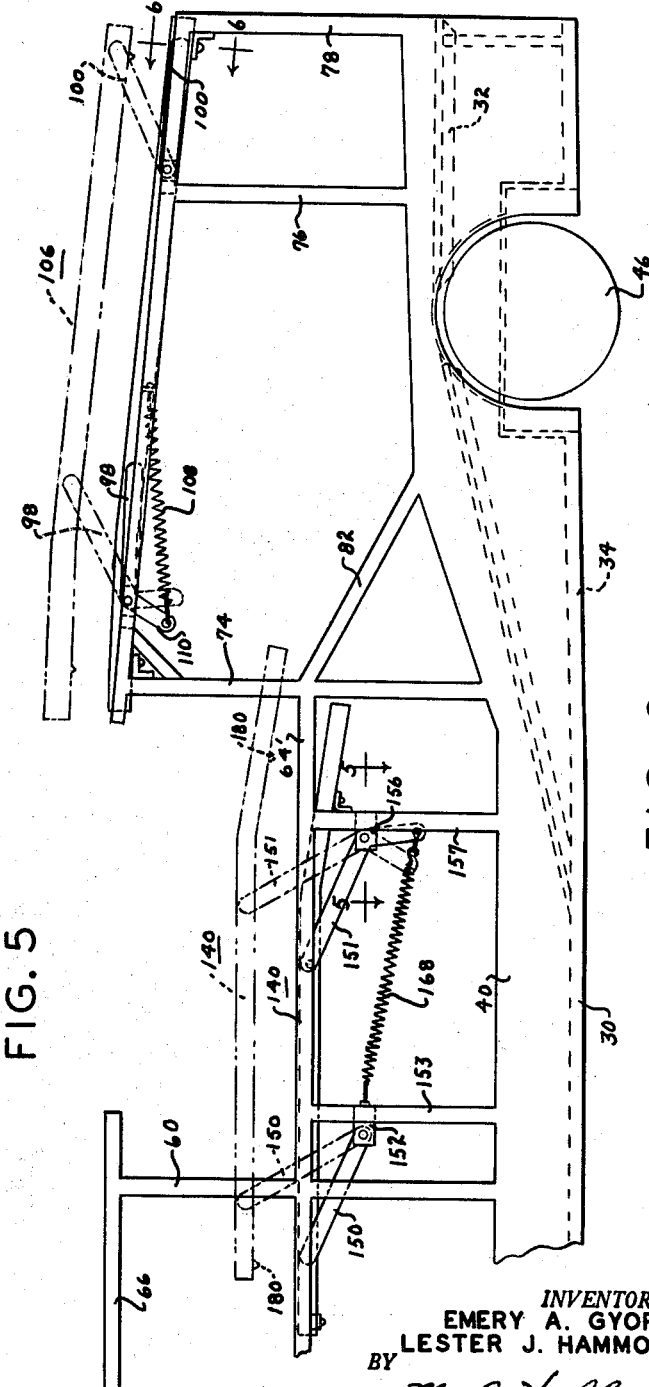
FIGURE 3 is a fragmentary side elevational view of the trailer shown in the preceding figures, with the automobiles removed and the supporting structures of the trailer in position for loading the forward positioned automobiles thereon.

A rear structure is provided for supporting automobile G and consists on each side of the trailer of vertical members 74, 76 and 78 joined rigidly at their lower ends to bed 30 and supporting at their upper ends slightly diagonal, longitudinal members 80 and 81. Members 74 are supported by diagonal members 82 connected at their upper ends to support members 74 and at their lower ends to bed 30. The rigidity of the support for automobile G is enhanced by a continuation 64' of members 64 rigidly joined to vertical members 74. In order to permit automobiles C, E and F to be mounted on bed 30, the support for automobile G is provided with an elevatable channel iron structure consisting of channel iron members 90 and 92, the two members being connected rigidly to one another by cross members 94 and 96, and channel member 90 being supported by levers 98 and 100, pivotally connected at their upper ends to channel member 90 and at their lower ends to longitudinal member 80. Channel member 92 is connected to longitudinal member 81 in a similar manner, by pivoted levers 102 and 104. It is seen that frame 106 formed by channel members 90 and 92 and cross members 94 and 96 provides a rigid unit which swings vertically from a position substantially parallel to and in the confines of longitudinal members 80 and 81 to the position shown in broken lines in FIGURE 3, thus permitting an automobile to be rolled thereunder on bed 30. To facilitate in the lifting of frame 106, a spring 108 on one or both sides of frame 106 is connected to an extension 110 of lever 98 and urges said lever in the counter-clockwise direction as shown in FIGURE 3 to raise frame 106. A centering and retaining unit is provided on each end of channels 90 and 92, as shown in FIGURES 6 and 8, consisting of a bracket 112 having a conical recess 114 in the upper surface thereof, and an arm 116 having a projection 118 in the lower surface thereof for seating in recess 114.

In order to facilitate the loading and unloading of automobile C, channel iron members 120 and 122 are pivotally supported at the rear edge of projection 54 on hinges 123 and 123' and are connected by cross members 124 and 126 to form a rigid frame 128. This frame is lowered from and raised to the position shown in full lines in FIGURE 9, to the position shown in broken lines designated by numeral 128', by hydraulic cylinders 130 and 132 connected to the frame by linkages 134 and 136, respectively. When frame 128 is in its lowered position as shown in FIGURE 9, a ramp 137 is placed on the free end of frame 128 and on the floor of bed 30 to provide a runway for rolling automobile C to and from the position shown in FIGURE 1.

One of the important features of the present invention is the utilization of the space normally lost over the hood and trunk of the automobiles on the trailer. This space is utilized in the present structure by incorporating in the foregoing described structure a frame 140 consisting of channel members 142 and 144 connected rigidly together by cross members 146 and 148. This frame is supported on the left-hand side of the trailer by pivoted members 150 and 151, the former being pivoted at its upper end to channel member 142 and at its lower end to a rigid bracket 152, on vertical member 153, and the latter being pivoted at its upper end to channel member 142 and at its lower end to a bracket 156 on vertical member 157. The frame is supported on the right-hand side of the trailer in a similar manner by pivoted levers 160 and 162, lever 160 being pivoted at its upper end to channel member 144 and at its lower end to bracket 164, and lever 162 being pivoted at its upper end to channel member 144 and at its lower end to bracket 166. In order to facilitate lifting of frame 140 from its lower position to the position shown in dotted lines in FIGURE 3, a pair of large coil springs 168 and 170 are attached to extensions 172 and 174 on levers 151 and 162, respectively. When frame 140 is in its raised position, as shown in broken lines in FIGURE 3, automobiles C and D can be moved to and from their respective positions in the forward end of the trailer. Frame 140 is provided with projections 180 on each side to assist in retaining the frame in proper position after it has been lowered and an automobile has been mounted thereon.

The frame 22 for automobile A consists of channel members 190 on each side supported by vertical members 192 and 194, rigidly secured to the frame of tractor 14. This structure is strengthened by diagonal members 196 and 198 connected at their upper ends to channel members 190 and at their lower ends to vertical members 192 and 194, respectively.

Figure 9:
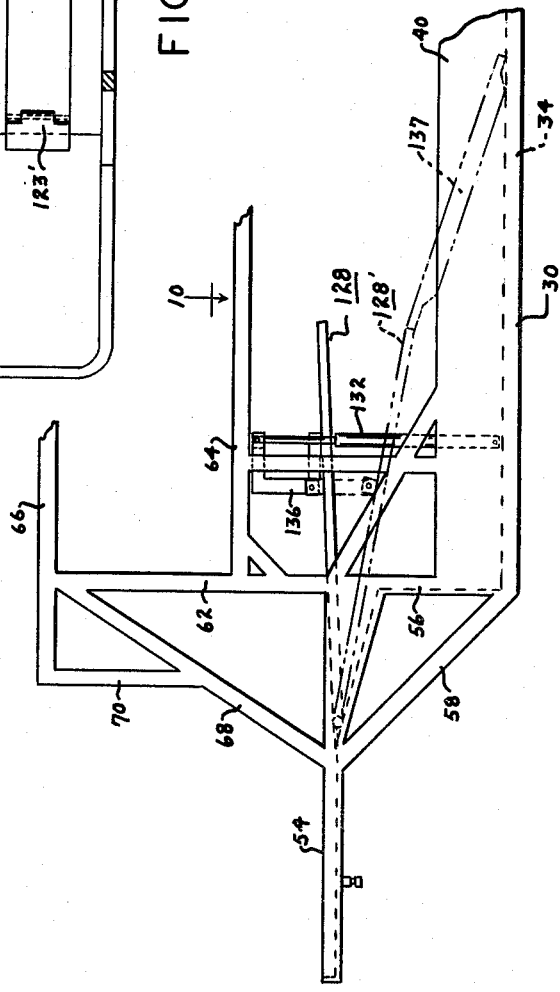
FIGURE 9 is a fragmentary side elevational view completing the fragmentary view shown in FIGURE 3.

In loading the trailer of the foregoing structure, frames 106 and 140 are moved to their raised positions shown in broken lines in FIGURE 3, frame 128 is moved to its lowered position as shown in FIGURE 9, and a ramp is placed from the rear end of the latter frame to the floor of bed 30. With the three frames in their foregoing respective positions, automobile C is rolled onto the trailer from the rear end thereof to its fully forward position as shown in FIGURE 1. Thereafter, frame 128 is moved to its raised position by hydraulic cylinders 130 and 132 and the ramp removed. The two cylinders may be operated from a manually operated pump or from an electrical or other power means from the engine of the tractor. After frame 128 has been moved to its elevated position, automobile D is then rolled onto the bed of the trailer to its position shown in FIGURE 1 with the forward end thereof beneath frame 128. A removable bridge is then inserted between adjacent ends of channel members 72 and 73 and 90 and 92, and a bridge is mounted between channel members 190 and channel members 72 and 73. With these bridges in place, automobiles A and B are rolled from the rear of the trailer to the positions shown in FIGURE 1. Thereafter, the two bridges are removed, and frame 106 is again elevated and automobiles E and F are rolled into the rear end of the trailer, with a ramp being used to lift automobile E on frame 140. Thereafter, frame 106 is moved to its lowered position, and automobile G is mounted in place on channel members 90 and 92. When all of the automobiles have been assembled in the foregoing manner, they are chained, or otherwise secured in their respective places on the trailer ready to be transported to their destination. When the trailer has arrived at its destination, the automobiles are removed from the trailer by the operation just described, performed in reverse.

One modification which may be used if desired is the lengthening of pivoted levers 150, 151, 160 and 162 so that frame 140 will be lifted as it pivots upwardly into the space between channels 72 and 73 on one hand, and channels 90 and 92 on the other hand, thus eliminating the need for the bridge between the two sections. When frame 140 has been moved into its elevated position between the two sections, it may be locked or otherwise held in that position by any suitable means while it is serving as the bridge.

The fundamental concept of the invention is directed to the location of the structure supporting automobile E, the elevatable frame 140 being required only to permit loading and unloading of automobiles C and E. Frame 140 instead of moving vertically may be pivoted to swing from horizontal position to a vertical position at one side of the trailer, or the two channels may be separated and each pivoted separately to swing laterally or vertically independently.

The present automobile trailer may be used with or without the supporting structure 22 for automobile A if desired. Various modifications and changes may be made in the trailer described herein without departing from the scope of the present invention.

We claim:

1. A trailer adapted to be towed by a tractor for hauling automobiles, comprising an elongated bed, a projection extending forwardly from and above said bed, an undercarriage for said bed near the rear end thereof, structural means rigidly connecting said projection to the forward end of said bed, a frame having two longitudinal channel members pivoted to said structural means and extending rearwardly over said bed, means for raising and lowering said frame members to and from a horizontal position and supporting said frame members in their raised position, members forming a rigid structure over the forward end of said bed, longitudinal members on said rigid structure for receiving an automobile, members forming a rigid structure over the rearward end of said bed, a second mentioned frame having longitudinal members for receiving an automobile, a pair of levers on each side of said second mentioned frame, each lever pivoted at one end to said frame and at the other end to the top portion of said rearward structure, members forming a rigid intermediate structure between and lower than said forward and rearward structures, a horizontal vertically movable frame associated with said intermediate structure and having longitudinal members for receiving an automobile, and a pair of levers on each side of said intermediate structure, each lever pivoted at one end to said intermediate frame and at the other end to the top portion of said intermediate structure for raising and lowering said movable frame in a substantially horizontal position.

2. A trailer adapted to be towed by a tractor for hauling automobiles, comprising an elongated bed sufficiently long to receive two automobiles in end to end relation, a projection extending forwardly from and above said bed, an undercarriage for said bed near the rear end thereof, structural means rigidly connecting said projection to the forward end of said bed, a frame having two longitudinal channel members pivoted to said structural means and extending rearwardly over said bed, means for raising and lowering said frame members to and from a horizontal position and supporting said frame members in their raised position, members forming a rigid structure over the forward end of said bed, longitudinal members on said rigid structure for receiving an automobile, members forming a rigid structure over the rearward end of said bed, a frame having longitudinal members for receiving an automobile, a pair of levers on each side of said second mentioned frame, each lever pivoted at one end to said second mentioned frame and at the other end to the top portion of said rearward structure, spring means connected for assisting in elevating said last mentioned frame, members forming a rigid intermediate structure between and lower than said forward and rearward structures, a horizontal vertically movable frame associated with said intermediate structure and having longitudinal members for receiving an automobile, a pair of levers on each side of said intermediate structure, each lever pivoted at one end to said intermediate frame and at the other end to the top portion of said intermediate structure for raising and lowering said movable frame in a substantially horizontal position, and spring means connected to said movable frame for assisting in elevating said intermediate frame.

3. A trailer adapted to be towed by a tractor for hauling automobiles, comprising an elongated bed sufficiently long to receive two automobiles in end to end relation, a projection extending forwardly from and above said bed, an undercarriage for said bed near the rear end thereof, structural means rigidly connecting said projection to the forward end of said bed, a frame having two longitudinal channel members pivoted to said structural means and extending rearwardly over said bed, means for raising and lowering said frame members to and from a horizontal position and supporting said frame members in their raised position, members forming a rigid structure over the forward end of said bed, longitudinal channel members on said rigid structure for receiving an automobile, members forming a rigid structure over the rearward end of said bed, a frame having longitudinal channel members for receiving an automobile, a pair of levers on each side of said last mentioned frame, each lever pivoted at one end to said last last mentioned frame and at the other end to the top portion of said rearward structure, spring means connected to one of said levers on each side for assisting in elevating said last mentioned frame, members forming a rigid intermediate structure between and lower than said forward and rearward structures, a movable intermediate frame having longitudinal channel members for receiving an automobile, a pair of levers on each side of said intermediate structure, each lever pivoted at one end to said intermediate frame and at the other end to the top portion of said intermediate structure for raising and lowering said movable frame in a substantially horizontal position, and spring means connected to one of said levers on each side for assisting in elevating said intermediate frame.

4. A trailer adapted to be towed by a tractor for hauling automobiles, comprising an elongated bed sufficiently long to receive two automobiles in end-to-end relation, a projection extending forwardly from and above said bed, an undercarriage for said bed near the rear end thereof, structural means rigidly connecting said projection to the forward end of said bed, a frame having two longitudinal channel members pivoted to said structural means and extending rearwardly over said bed, means for raising and lowering said frame members to and from a horizontal position and supporting said frame members in their raised position, members forming a rigid structure over the forward end of said bed, longitudinal channel members on said rigid structure for receiving an automobile, members forming a rigid structure over the rearward end of said bed, a frame having longitudinal channel members for receiving an automobile, a pair of levers on each side of said last mentioned frame, each lever being pivoted at one end to said frame and at the other end to the top portion of said rearward structure, spring means connected to one of said levers on each side for assisting in elevating said last mentioned frame, members forming a rigid intermediate structure disposed between and joined to said forward and rearward structures and being approximately half as high as said forward and rearward structures, a horizontal vertically movable frame associated with said intermediate structure and having longitudinal channel members for receiving an automobile, a pair of levers on each side of said intermediate structure, each lever pivoted at one end to said intermediate frame and at the other end to the top portion of said intermediate structure for raising and lowering said movable frame in a substantially horizontal position, and spring means connected to one of said levers on each side for assisting in elevating said intermediate frame.

5. A trailer adapted to be towed by a tractor for hauling automobiles, comprising an elongated bed sufficiently long to receive two automobiles in end-to-end relation, a projection extending forwardly from and above said bed, an undercarriage for said bed near the rear end thereof, a fifth wheel on said projection supported by the tractor, structural means rigidly connecting said projection to the forward end of said bed, a frame having two longitudinal channel members pivoted to said structural means and extending rearwardly over said bed, hydraulic means raising and lowering said frame members to and from a horizontal position and supporting said frame members in their raised position, members forming a rigid structure over the forward end of said bed, longitudinal channel members on said rigid structure for receiving an automobile, members forming a rigid structure over the rearward end of said bed, a rearward frame having longitudinal channel members for receiving an automobile, a pair of levers on each side of said rearward frame, each lever pivoted at one end to said rearward frame and at the other end to the top portion of said rearward structure, spring means connected to one of said levers on each side for assisting in elevating said last mentioned frame, members forming a rigid intermediate structure disposed between and joined to said forward and rearward structures and being approximately half as high as said forward and rearward structures, a horizontal verticlly movable intermediate frame associated with said intermediate structure and having longitudinal channel members for receiving an automobile, a pair of levers on each side of said intermediate structure, each lever pivoted at one end to said intermediate frame and at the other end to the top portion of said intermediate structure for raising and lowering said movable frame in a substantially horizontal position, and spring means connected to one of said levers on each side for assisting in elevating said intermediate frame to a position between the upper ends of said forward and rearward structures.

References Cited in the file of this patent

UNITED STATES PATENTS

| | | |
|---|---|---|
| 2,132,464 | Francis | Oct. 11, 1938 |
| 2,695,810 | Demos | Nov. 30, 1954 |
| 2,993,725 | Van Keuren | July 25, 1961 |